United States Patent Office 3,006,841
Patented Oct. 31, 1961

3,006,841
HYDROCARBON CONVERSION PROCESS
Vladimir Haensel, Hinsdale, Ill., assignor, by mesne assignments, to Universal Oil Products Company, Des Plaines, Ill., a corporation of Delaware
No Drawing. Filed Sept. 16, 1953, Ser. No. 380,605
8 Claims. (Cl. 208—139)

This application is a continuation-in-part of my copending application Serial No. 344,689, filed March 25, 1953 which is a continuation-in-part of application Serial No. 141,173 filed January 28, 1950, now abandoned.

This invention relates to the catalytic conversion of hydrocarbon fractions containing naphthenes and paraffins. It is more specifically concerned with a particular method of reforming gasolines and naphthas in the presence of hydrogen and a catalyst comprising at least one refractory oxide and a metal component selected from the group consisting of the metals and compounds of the metals in the platinum group.

It has been found that reforming catalysts that promote hydrocracking of paraffins, in addition to dehydrogenation of naphthenes, give yield-octane number relationships that are superior to those obtained with reforming catalysts that promote only dehydrogenation of naphthenes. Catalysts that promote both reactions include platinum and/or palladium composited with refractory oxides such as alumina, silica, zinc oxide, magnesia, zirconia, thoria, etc., as well as supports comprising two or more inorganic refractory oxides such as silica-alumina, silica-magnesia, silica-zirconia, silica-thoria, silica-zinc oxide, silica-alumina-magnesia, silica-alumina-zirconia, silica-alumina-thoria, silica-alumina-zinc oxide, etc., or catalysts comprising alumina, a component from the platinum group, combined halogen, especially combined fluorine and/or combined chlorine. In general, the activity of such catalysts gradually decreases with use due to several factors including deposition of carbonaceous material on the catalyst and possible poisoning by traces of impurity in the feed. I have also found that the dehydrogenating activity of the catalyst varies considerably with the concentration of sulfur in the reaction zone, especially when processing hydrocarbon charge stocks of low sulfur content. Too low a sulfur content will deactivate the catalyst rapidly and, therefore, according to the process of my invention, a sulfur containing component is added to the reforming zone to maintain the activity of the catalyst. The addition of small amounts of sulfur promoter to the reaction zone where the sulfur content of the hydrocarbon charge is low tends to maintain the catalyst activity without other deleterious effects.

Previously a sulfur compound was introduced to the reaction zone in amount to increase the hydrocracking activity of the catalyst, however, as mentioned, at low sulfur levels in the reaction zone the addition of sulfur may be so controlled as to maintain the overall activity. The use of such small amounts of a sulfur containing component thus greatly prolongs the life of the catalyst.

In one embodiment my invention relates to an improvement in the reforming of a hydrocarbon charge stock containing paraffins and naphthenes and boiling within the gasoline range by contacting said stock and a hydrogen rich gas at reforming conditions with a catalyst comprising a metal component selected from the metals and compounds of the metals in the platinum group, said improvement comprising adding a sulfur containing component to the reforming zone independently of said catalyst and during the reforming, in an amount so that the total sulfur content entering the reforming zone is from about 0.01% to about 0.06% by weight of the total charge.

In another embodiment my invention relates to an improvement in the reforming of a hydrocarbon charge stock containing paraffins, naphthenes and less than about 0.01% by weight of the total sulfur and boiling within the gasoline range by contacting said stock and a hydrogen rich gas at reforming conditions with a catalyst comprising a metal component selected from the metals and compounds of the metals in the platinum group, which catalyst effects dehydrogenation of naphthenes and hydrocracking of paraffins, said improvement comprising adding a sulfur containing component to the reforming zone independently of said catalyst and during the reforming in an amount so that the total sulfur content entering the reaction zone is from about 0.01% to about 0.06% by weight of the total charge thereby maintaining the dehydrogenating activity substantially constant.

In one aspect my invention relates to the use of sulfur containing components in the reforming of hydrocarbons in the presence of catalysts comprising at least one refractory inorganic oxide and a metal component selected from the metals and compounds of the metals in the platinum group to maintain a balance between the various reactions promoted by such catalysts. For example, during the course of a reforming operation using a catalyst comprising platinum and alumina, it may become necessary to alter the quantity of the reformate being produced or the product distribution being obtained. When processing a hydrocarbon fraction with a low concentration of sulfur, it has been found that the catalyst activity rapidly declines especially in reference to the dehydrogenation activity. According to my invention a sulfur containing component is added to the charge to maintain the dehydrogenation activity, and it has been found that this sulfur addition greatly increases catalyst life.

The formation of carbonaceous material on the catalyst is one of the main causes of catalyst deactivation. When processing charging stocks in which the total sulfur content of the charge entering the reaction zone is below 0.01% by weight of the total charge, high carbon levels immediately form on the catalyst and the catalyst activity, especially in reference to dehydrogenation activity, rapidly declines. When processing some charging stocks, especially at less severe conditions in the reforming zone, it has been found that sulfur levels down to about 0.005% by weight of the total charge may be used without excessive carbon formation, however, it is preferred that the sulfur content entering the reaction zone be at least 0.01% by weight of the total charge.

During most reforming operations, the hydrocarbon charge stock enters the reaction zone along with a hydrogen rich gas that is usually recycled within the process and often times the recycle gas will contain sulfur as hydrogen sulfide. By the total sulfur content entering the reaction zone I mean the combination of sulfur in the charging stock and in the hydrogen rich gas entering the reaction zone; and further, the sulfur may be present as various compounds, however, the weight percent is calculated as the weight percent of the element sulfur, even though the sulfur is present as a compound.

The hydrocarbon stocks that can be converted in accordance with my process comprise hydrocarbon fractions containing naphthenes and paraffins. The preferred stocks are those consisting essentially of naphthenes and paraffins although in some cases aromatics and/or olefins may also be present. This preferred class includes straight run gasolines, natural gasolines, and the like. On the other hand, it frequently is advantageous to charge thermally or catalytically cracked gasoline or higher boiling fractions thereof to my reforming process. Mixtures of straight run and cracked gasolines are usually used. The gasoline charge stock may be a full boiling range gasoline having an initial boiling point of from about 50° F. to about 100° F. and an end boiling point within the range of from about 325° F. to about 425° F., or it may be a selected fraction thereof which usually will be a higher boiling fraction commonly referred to as naphtha and generally having an initial boiling point within the range of from about 125° F. to about 250° F. and an end boiling point within the range of from about 350° F. to about 425° F.

The reforming catalysts that can be used in my process comprise catalysts containing at least one refractory oxide and a metal selected from the group consisting of the metals and the compounds of the metals in the platinum group. In general, these catalysts are capable of promoting hydrocracking of paraffins and dehydrogenation of naphthenes, even in the absence of one of the sulfur containing activators of this invention in the reaction zone. The active metal components that may be used in the catalyst are selected from the metals and compounds of the metals, ruthenium, rhodium, palladium, osmium, iridium and platinum.

The sulfur containing activators of my invention are specifically suited to use with catalysts containing platinum group components. Previously it was thought that the addition of any foreign substance to the charging stock would adversely affect a platinum containing catalyst. I have discovered that sulfur containing components may be added to the reaction zone in a reforming process with beneficial results. I have also discovered that by the use of the sulfur containing components, as herein specified, that it is possible to maintain the dehydrogenation activity of the catalyst by markedly reducing the carbon formation on the catalyst.

Platinum containing catalysts on a suitable support may be used in this invention. Preferred types of catalysts for use in my process comprise alumina, platinum and combined halogen, especially combined fluorine and/or combined chlorine. Catalysts of this latter type are described in detail in my U.S. Patent No. 2,479,109, issued August 16, 1949. They are prepared by forming a mixture of alumina and a halogen compound, the halogen being in an amount of from about 0.05% to about 3% by weight of said alumina on a dry basis, and thereafter compositing about 0.01% to about 1.5% by weight of platinum with the mixture and subsequently heating the composite.

Another group catalysts that promote both hydrocracking and the dehydrogenation reactions and that may be used in the present process comprises a cracking component and a metal component selected from the metals and compounds of the metals platinum and palladium. The cracking component ordinarily will comprise silica and at least one other metal oxide usually selected from the group consisting of alumina, zirconia, magnesia, and thoria. The cracking component may also comprise alumina-boron oxide composites. Catalysts in this group are made, for example, by drying a composite of silica hydrogel and alumina hydrogel and thereafter incorporating into the dried composite a metal component from the group consisting of platinum and palladium in an amount of from about 0.05% to about 1.5%. Further details concerning the preparation of catalysts of this type will be found in my U.S. Patent No. 2,478,916.

It has heretofore been thought that only halogens or halogen containing compounds such as chlorine, hydrogen fluoride, ethyl chloride, or tertiary butyl chloride were capable of maintaining the activities of the catalysts of the type described herein, however, I have discovered that when the sulfur concentration of the combined hydrocarbon charge stock stream and hydrogen rich gas stream is below a certain level that the addition of a sulfur containing component according to the process of my invention will maintain the activity.

Any sulfur containing promoter which is converted to hydrogen sulfide by reaction with hydrogen at the conditions in the reaction zone of the reforming process may be used in my process. Suitable sulfur containing components include sulfur, hydrogen sulfide, primary, secondary and tertiary alkane and cycloalkane thiols, aromatic thiols, aromatic sulfides, alkane sulfides and disulfides, thiophenes and thiophanes.

In the art it is mentioned that sulfur has an adverse effect on platinum containing catalysts, however, I have now discovered that sulfur compounds may be used to maintain dehydrogenation activity as herein set forth, and, further, the sulfur compound instead of increasing carbon formation on the catalyst actually lowers the carbon formation and greatly prolongs the useful life of the catalyst.

Although applicant does not wish to be bound by any theory or mechanism, it appears as though the sulfur containing components, herein mentioned, function by increasing the acidity of the catalyst system. It appears that in order for the catalyst to have sufficient dehydrogenating activity that the catalyst must possess a certain crystal lattice of the active metal component and further that the active metal component must be activated. I have discovered that sulfur containing components will activate the dehydrogenation activity and according to the process of my invention a sulfur containing component is introduced into the reaction zone of a reforming process when reforming charge stocks of low sulfur content.

Hydrocarbons may be reformed in accordance with my process using fluidized, fluidized-fixed bed, suspensoid, or moving bed types of processes. However, I prefer to use fixed-bed processes primarily because operations of this type tend to minimize attrition losses of the relatively expensive catalyst. One fixed-bed method of utilizing the process comprises preheating hydrogen rich gas and hydrocarbon charge stock to conversion temperature and passing the same in admixture with a sulfur containing component through a plurality of substantially adiabatic reaction zones containing a catalyst of the type described herein. The sulfur containing component may be added continuously or intermittently. The sulfur containing component may be added to the reaction zone at the inlet to the catalyst; it may be added at a point down stream of the inlet to the reaction zone, or where several reactors are used, it may be introduced to the first reactor or to any other one of the reactors, or it may be introduced to several of the reactors, or at several points in the same reaction zone. In all but the last stages the reaction is usually endothermic, hence the reaction streams passing between the reaction zones are reheated to the desired temperatures. The reformed hydrocarbons are recovered and a hydrogen-rich gas is separated and recycled to the reaction zone. It is within the scope of this invention to introduce the sulfur containing component into this hydrogen rich recycle gas and in processes wherein the hydrogen rich gas is introduced from an extraneous source, it is within the scope of this invention to introduce the sulfur containing component into this hydrogen rich gas stream. Another type of fixed-bed process that is particularly suitable for certain types of operations comprises passing the hydrocarbon charging stock together with hydrogen and the requisite amount of sulfur containing component through tubes containing a catalyst, said tubes being subjected to radiant heat from a radiant flame and the resultant hot products of combustion. Here again the reformate is recovered and the hydrogen is separated or recycled to the reaction zone.

Usually the most convenient way of adding the sulfur containing component to the reforming zone is to commingle it with the hydrocarbon charging stock passing thereto. Another method is to add it to the reforming zone independently of the charging stock but at the same time the hydrocarbon is being reformed as hereinbefore mentioned. Still another method is to add it to the hydrogen rich gas passing into the reaction zone.

The temperatures at which the hydrocarbon reforming operations will be carried out in accordance with my process will vary somewhat depending upon the particular type of catalyst that is employed. When the catalyst comprises a cracking component and a metal component selected from the group consisting of the metals and compounds of the metals platinum and palladium, the reaction temperatures ordinarily will lie within the range of from about 600° F. to about 1000° F. When the catalyst comprises platinum-alumina-combined halogen the temperatures ordinarily will lie within the range of from about 750° F. to about 1000° F.

Pressures at which my process are conducted lie within the range of from about 50 to about 1500 p.s.i.; a total pressure of at least 250 pounds ordinarily is preferred. The weight hourly space velocity, which is defined as the weight of hydrocarbon charge per hour per weight of catalyst in the reaction zone, should lie within the range of from about 0.2 to about 20. The amount of hydrogen rich gas charged along with the hydrocarbon is such that the amount of hydrogen charged along with the hydrocarbons is from about 0.5 to about 20 mols of hydrogen per mol of hydrocarbon.

The amount of sulfur containing component added is that amount so that the total sulfur content entering the reforming zone is from about 0.01% to about 0.06% by weight of the total charge. The sulfur content to the zone is, thereby, greater than that of the charge stock.

The following examples are introduced to further illustrate the novelty and utility of the present invention but not with the intention of unduly limiting the same.

*Example I*

A desulfurized Kuwait straight run naphtha having an initial boiling point of 280° F. and an end boiling point of 391° F. and a total sulfur content of 0.0012 weight percent was reformed in the presence of a catalyst comprising alumina, 0.6% halogen and 0.4% platinum. The reforming was conducted at an average catalyst temperature of 900° F., a pressure of 500 pounds per square inch, a liquid hourly space velocity of 3.0 and a hydrogen to hydrocarbon mol ratio of 11. In this run, referred to as run 1, no sulfur could be detected in the recycle gas. The octane number of the product started to decrease rapidly very early in the processing period. Tertiary butyl mercaptan was added in an amount so that the total sulfur entering the reaction zone was about 0.01% by weight of the charge. The catalyst activity continued to drop off, but not as rapidly, indicating that the absence of sulfur during the initial stages had already carbonized the catalyst.

*Example II*

A fresh batch of catalyst was used in run 2 to reform the charge stock as used in run 1 of Example I and at substantially the same processing conditions. The octane number and activity of the catalyst started to decline rapidly. The run was continued for about forty hours after which time the plant was shut down and the catalyst analyzed for carbon content. The carbon on the catalyst was in amount of about 2.3% by weight of the total catalyst. At the end of this run the catalyst was substantially deactivated. The plant was started up on a fresh batch of catalyst. Tertiary butyl mercaptan was added to the charging stock in amount so that the total sulfur entering the reaction zone was about 0.01% by weight of the total charge. At the end of forty hours of processing the plant was again shut down and the catalyst analyzed for carbon content. The carbon measured approximately 1.8% by weight of the total catalyst. During this run, the activity of the catalyst was substantially more uniform than when tertiary butyl mercaptan was not added.

The plant was again started up on a fresh batch of catalyst and this time tertiary butyl mercaptan was added in amount so that the total sulfur content entering the reaction zone was about 0.04% by weight of the total charge. At the end of forty hours the carbon content of the catalyst was only about 0.9% by weight of the total catalyst. Using another fresh batch of catalyst and adding tertiary butyl mercaptan in amount so that the total sulfur content entering the reaction zone was about 0.06% by weight of the total charge at the end of forty hours the carbon content of the catalyst was only 0.6% by weight of the total catalyst.

*Example III*

A fresh batch of catalyst was used in run 3 to reform the charge stock as used in run 1 of Example I and at substantially the same conditions. Tertiary butyl mercaptan was added at the start of the run in amount so that the total sulfur entering the reaction zone was about 0.012 by weight of the total charge. 395 standard cubic feet of hydrogen were being produced per barrel of charge. The octane number of the product started dropping slowly and the hydrogen gas make also continued dropping slowly. This indicates that the lower limit of sulfur entering the reaction zone should be about 0.01% by weight of the total charge in order to maintain the activity of the catalyst substantially constant. Tertiary butyl mercaptan was increased to maintain the concentration of sulfur entering the reaction zone at about 0.028% to about 0.056% by weight of the total charge. The hydrogen gas make remained between about 347–402 s.v.f./bbl. during this period. The operation remained stable over an extended time with the octane number of the product remaining very constant. During the latter stages of the processing cycle, the sulfur was reduced in amount so that the total sulfur content of the charge entering the reaction zone was about 0.015% by weight of the total charge. Amounts of sulfur below about 0.01% by weight of the total charge caused the dehydrogenation activity of the catalyst to decline. Amounts of sulfur above about 0.06% by weight of the total charge produced undesirable side reactions and excessive hydrocracking.

I claim as my invention:

1. In the reforming of a hydrocarbon charge stock containing paraffins, naphthenes and less than about 0.01% by weight of total sulfur, and boiling within the gasoline range by contacting said stock and a hydrogen rich gas at reforming conditions with a catalyst comprising a refractory oxide support and a metal dehydrogenating component consisting essentially of a member selected from the metals and compounds of the metals in the platinum group, which catalyst effects dehydrogenation of naphthenes and hydrocracking of paraffins, the improvement which comprises adding a sulfur promoter to the reforming zone independently of said catalyst and during the reforming, in an amount so that the total sulfur content entering the reforming zone is from about 0.01% to about 0.06% by weight of the total charge, thereby maintaining the dehydrogenating activity substantially constant.

2. The improvement of claim 1 further characterized in that said sulfur promoter comprises a thiohydrocarbon.

3. The improvement of claim 1 further characterized in that said sulfur promoter comprises hydrogen sulfide.

4. The improvement of claim 1 further characterized in that said sulfur promoter comprises tertiary butyl mercaptan.

5. The improvement of claim 1 further characterized in that said sulfur promoter is added to the reforming zone by being commingled with said hydrocarbon charge stock.

6. The improvement of claim 1 further characterized in that said sulfur promoter is added to the reforming zone simultaneously with but independently of said hydrocarbon charge stock.

7. A process for reforming a hydrocarbon fraction boiling in the gasoline range and containing naphthenes, paraffins and less than 0.01% by weight of sulfur, which comprises subjecting said fraction in a reforming zone to the action of a platinum-alumina-halogen catalyst at a temperature of from about 750° to about 1000° F. and in the presence of hydrogen, and introducing to said zone during the reforming therein a sulfur promoter in an amount to provide a sulfur concentration of from 0.01% to 0.06% by weight of said hydrocarbon fraction.

8. In a process for hydroforming a petroleum naphtha charge stock containing paraffins, naphthenes and less than 100 parts per million of total sulfur, based on said naphtha, by contacting said stock and a hydrogen rich gas at reforming conditions with a platinum supported catalyst, the improvement which comprises adding a sulfur promoter to the hydroforming zone independently of said catalyst and during the reforming, to produce a total sulfur content entering the reforming zone of from about 100 to about 300 parts per million based on the total charge, whereby the activity of the catalyst is kept substantially constant.

References Cited in the file of this patent

UNITED STATES PATENTS

| | | |
|---|---|---|
| 2,478,916 | Haensel | Aug. 16, 1949 |
| 2,642,381 | Dickinson | June 16, 1953 |
| 2,642,383 | Berger | June 16, 1953 |